US012113318B2

(12) United States Patent
Koga et al.

(10) Patent No.: US 12,113,318 B2
(45) Date of Patent: Oct. 8, 2024

(54) COAXIAL CONNECTOR WITH THREE-POINT CONTACT TYPE TERMINAL

(71) Applicant: J.S.T. Mfg. Co., Ltd., Tokyo (JP)

(72) Inventors: Shinichi Koga, Yokohama (JP); Akihiko Otsu, Yokohama (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 375 days.

(21) Appl. No.: 17/686,233

(22) Filed: Mar. 3, 2022

(65) Prior Publication Data

US 2022/0285894 A1 Sep. 8, 2022

(30) Foreign Application Priority Data

Mar. 5, 2021 (JP) ................................ 2021-035413

(51) Int. Cl.
*H01R 13/405* (2006.01)
*H01R 4/18* (2006.01)
(Continued)

(52) U.S. Cl.
CPC ............ *H01R 24/40* (2013.01); *H01R 4/183* (2013.01); *H01R 13/405* (2013.01); *H01R 13/502* (2013.01)

(58) Field of Classification Search
CPC . H01R 24/38; H01R 4/10; H01R 4/18; H01R 13/40; H01R 13/405; H01R 13/46;
(Continued)

(56) References Cited

U.S. PATENT DOCUMENTS

2015/0056866 A1* 2/2015 Osaki ................ H01R 13/6277 439/675
2019/0296459 A1* 9/2019 Miyazaki .............. H01R 13/42
2020/0203859 A1* 6/2020 Haga ....................... H01R 9/05

FOREIGN PATENT DOCUMENTS

CN 204045796 U 12/2014
JP 2008-147094 A 6/2008
(Continued)

OTHER PUBLICATIONS

Translated abstract of JP2017208257A (Year: 2017).*
(Continued)

*Primary Examiner* — Abdullah A Riyami
*Assistant Examiner* — Amara Anderson
(74) *Attorney, Agent, or Firm* — Kratz, Quintos & Hanson, LLP

(57) ABSTRACT

The present invention provides a further miniaturized coaxial connector. A coaxial connector includes a contact by three-point contact, a housing including a first and a second connection base, and a shell including a cylindrical portion accommodating the first connection base and an extension portion accommodating the second connection base. The contact disposed inside an accommodation space on the first connection base, includes three terminals including a pair of fixed terminals and a movable terminal that are erected from a tip end side of a metal plate. The pair of fixed terminals are located at a set of vertices among vertices of a virtual equilateral triangle inscribed in a mating contact, the movable terminal is located at the other vertex of the virtual equilateral triangle, and a contact surface of the movable terminal is disposed in a state of facing an intermediate portion of the pair of fixed terminals.

4 Claims, 14 Drawing Sheets

(51) Int. Cl.
*H01R 13/502* (2006.01)
*H01R 24/40* (2011.01)

(58) Field of Classification Search
CPC ........ H01R 24/40; H01R 24/50; H01R 4/183; H01R 13/502; H01R 13/02; H01R 9/0518; H01R 2103/00
See application file for complete search history.

(56) References Cited

FOREIGN PATENT DOCUMENTS

| | | | | |
|---|---|---|---|---|
| JP | 3191979 | U | | 7/2014 |
| JP | 2016-192274 | A | | 11/2016 |
| JP | 2017-174624 | A | | 9/2017 |
| JP | 2017208257 | A | * | 11/2017 |
| JP | 2019-169361 | A | | 10/2019 |

OTHER PUBLICATIONS

Office Action of Japanese Patent Application No. 2021-035413: Notice of Reasons for Refusal issued Jun. 25, 2024 (3 sheets, 5 sheets translation, 8 sheets total).

* cited by examiner

COAXIAL CONNECTOR WITH THREE-POINT CONTACT TYPE TERMINAL

This application is based on and claims the benefit of priority from Japanese Patent Application No. 2021-035413, filed on 5 Mar. 2021, the content of which is incorporated herein by reference.

BACKGROUND OF THE INVENTION

Field of the Invention

The present invention relates to an electrical connector. In particular, the present invention relates to a small-sized coaxial connector configured on an end of a coaxial cable and to a structure of the coaxial connector including a shell electrically connected to an external conductor of the coaxial cable on one end side and formed in a cylindrical shape on the other end side.

Related Art

The coaxial connector fixed to the terminal of the coaxial cable is connected to a receptacle mounted on a printed circuit board, and thus a high frequency signal can be transmitted from the coaxial cable to the printed circuit board. Alternatively, the high frequency signal can be transmitted from the printed circuit board to the coaxial cable.

In general, the coaxial cable is configured by a circular central conductor, a dielectric surrounding the central conductor, an external conductor such as a braided wire surrounding the dielectric, and an insulating sheath covering and protecting the external conductor. Further, the coaxial connector includes a housing and a bellows-shaped contact. The insulating sheath of the coaxial cable is fixed on one end side of the shell. Further, the external conductor of the coaxial cable is electrically connected on one end side of the shell. Further, the other end side of the shell is formed in a cylindrical shape (for example, see Japanese Unexamined Patent Application Publication No. 2019-169361).

According to Japanese Unexamined Patent Application Publication No. 2019-169361, the shell and the contact are electrically insulated by the housing. The contact is disposed inside the housing and is surrounded by some of external contacts of the shell in an annular shape. The contact is molded integrally with the housing by molding with a synthetic resin (insulating resin). The housing is provided with a disk portion including a columnar fitting portion protruding in a plate thickness direction, and the contact is disposed in a contact accommodation space that is opened on one surface side of the disk portion.

The contact includes a strip-shaped metal plate, and a base end side of the metal plate is an installation surface of a central conductor of the coaxial cable and is exposed to a surface of the housing. A pair of contact pieces are provided on a tip end side of the metal plate to face each other in a direction substantially perpendicular to the metal plate. When a mating contact is inserted between the pair of contact pieces, the pair of contact pieces spreads in a direction away from each other in a substantially horizontal direction, and sandwich the mating contact by springiness (elasticity) of approaching. Thus, the pair of contact pieces reliably come into contact with the mating contact and are electrically connected to the mating contact.

According to Japanese Unexamined Patent Application Publication No. 2019-169361, the columnar fitting portion can be inserted inside the cylindrical shell formed in the mating coaxial connector. When the fitting portions are inserted inside the cylindrical shell, a cylindrical mating contact disposed in a center of the cylindrical shell can be electrically connected to the pair of contact pieces disposed in the contact accommodation space.

As described above, the pair of contact pieces of the contact are configured to be displaced in the direction away from each other from a facing position in a substantially horizontal direction. In order to give an allowance for the displacement, the size of the contact accommodation space becomes large, and thus the outer diameter of the columnar fitting portion is made large. Accordingly, the size of the annular external contact surrounding the fitting portion becomes also large. In other words, a two-point contact structure of the contact according to the related art has a problem that downsizing of the coaxial connector is not easy.

SUMMARY OF THE INVENTION

The present invention has been made in view of the above problems, and is intended to provide a coaxial connector capable of further downsizing by changing a structure of a contact provided in the coaxial connector.

The present invention relates a contact for a coaxial connector capable of being connected to a cylindrical mating contact, and has a structure in which the contact externally contacts the mating contact by three-point contact. The three-point contact type contact is configured by a pair of fixed terminals located at a set of vertices among vertices of a virtual equilateral triangle inscribed in the mating contact and a movable terminal that can be elastically deformed located at the other vertex. This makes it possible to make the connector smaller than the coaxial connector using a two-point contact type contact that requires the terminals to spread in the direction away from each other.

(1) A coaxial connector according to an embodiment of the present invention is a coaxial connector configured on an end of a coaxial cable including a central conductor, a dielectric surrounding the central conductor, an external conductor that covers the dielectric, and an insulating sheath that clads the external conductor, the coaxial connector including: a contact capable of being connected to a cylindrical mating contact, the contact including a pair of fixed terminals and a movable terminal, the terminals being erected from a tip end side of a strip-shaped metal plate and being capable of externally contacting the mating contact by three-point contact; a housing including a first connection base and a second connection base, the first connection base including an accommodation space in which one surface side is open such that the mating contact is insertable and the pair of fixed terminals and the movable terminal are disposed inside, the second connection base partially protruding from the first connection base; and a conductive shell including a cylindrical portion that is open to the one surface side and is provided to surround the first connection base, and an extension portion at least including a gutter-shaped that is coupled to the cylindrical portion and is capable of accommodating the second connection base therein.

(2) Preferably, the pair of fixed terminals are located at a set of vertices among vertices of a virtual equilateral triangle inscribed in the mating contact, and the movable terminal is located at the other vertex of the virtual equilateral triangle, and is disposed in a state of being elastically deformed in a direction along a straight line passing through the vertex of the virtual equilateral triangle and an intermediate portion of the pair of fixed terminals.

(3) Preferably, the contact is molded integrally with the housing, and includes at least: an installation surface in which a base end side of the metal plate is exposed on a predetermined surface of a part of the second connection base, the installation surface being capable of coming into contact with the central conductor; and contact edges of the pair of fixed terminals, the contact edges being exposed to the accommodation space and capable of coming into contact with the mating contact.

(4) Preferably, the coaxial connector according to the present invention further includes a crimp housing including a slot that is notched so as to be capable of pressing an outer periphery of the central conductor and capable of being inserted from an opening side of the accommodation space toward a predetermined portion of the second connection base, wherein an extension portion of the shell includes a pair of first barrels capable of pressing the crimp housing against the second connection base, and a pair of second barrels capable of crimping the external conductor.

BRIEF DESCRIPTION OF THE DRAWINGS

FIGS. 3A and 3B are views showing the configuration of the coaxial connector according to the embodiment, wherein FIG. 3A is a bottom view showing the coaxial connector configured on the terminal of the coaxial cable, and FIG. 3B is a right side view of FIG. 3A;

FIGS. 8A and 8B are views showing the configuration of the housing provided in the coaxial connector according to the embodiment, wherein FIG. 8A is a plan view showing an upper surface of the housing, and FIG. 8B is a plan view showing a lower surface of the housing;

FIGS. 11A and 11B are each front views showing the configuration of the crimp housing provided in the coaxial connector according to the embodiment, wherein FIG. 11A shows a state before the crimp housing is completely attached to the housing, and FIG. 11B shows a state where the crimp housing is completely attached to the housing.

DETAILED DESCRIPTION OF THE INVENTION

Figure 1:
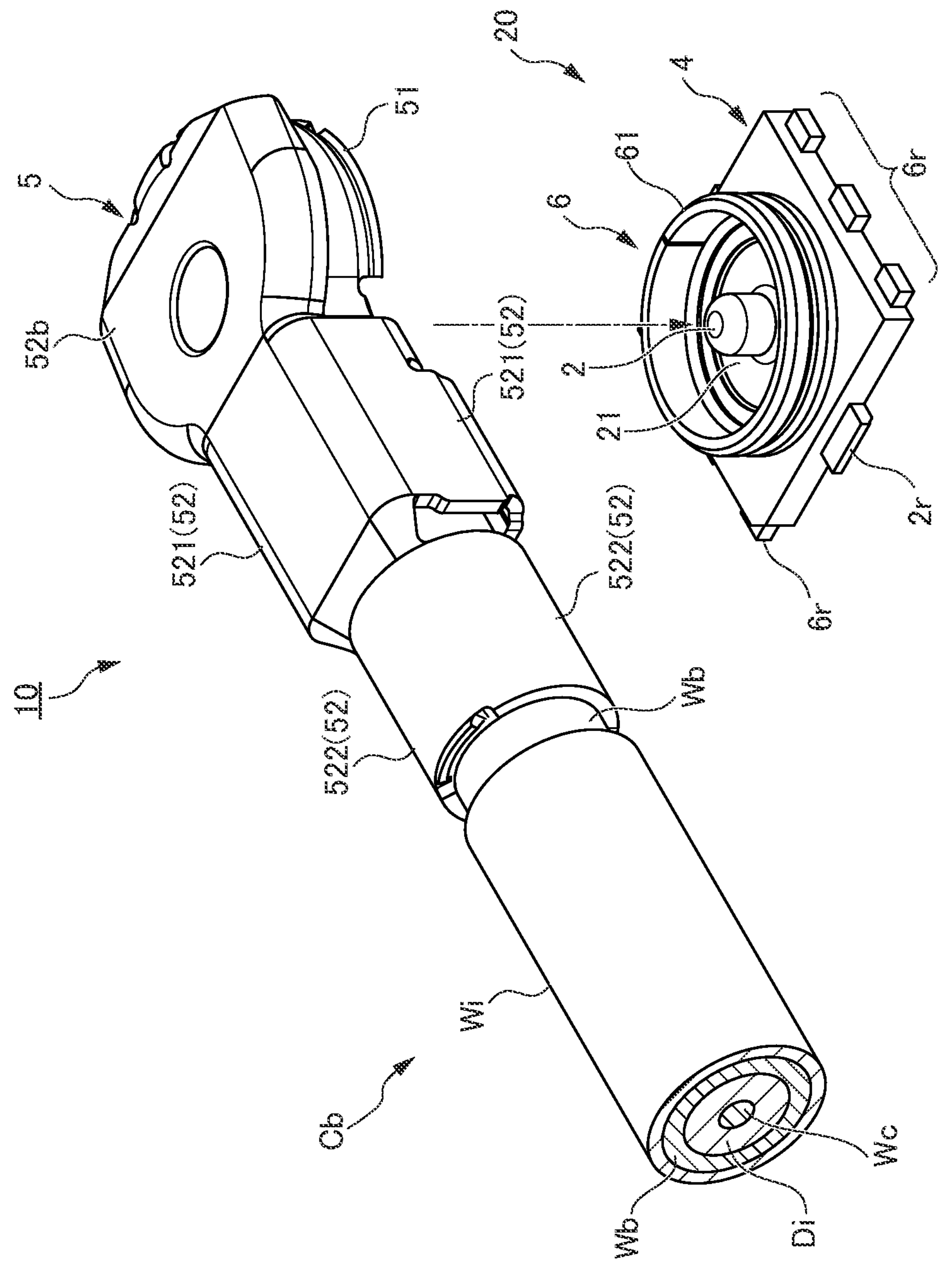
FIG. 1 shows a configuration of a coaxial connector according to an embodiment of the present invention, and is an external view of the coaxial connector configured on an end of a coaxial cable in which a mating coaxial connector is disposed so as to face when viewed from an upper surface side.

An embodiment of the present invention will be described below with reference to the drawings.

Configuration of Coaxial Connector

First, a configuration of a coaxial connector according to an embodiment of the present invention will be described.

Overall Configuration

With reference to FIGS. 1 to 6, a coaxial connector (hereinafter, also referred to as a plug) 10 according to an embodiment of the present invention is configured on an end of a coaxial cable Cb. The coaxial cable Cb includes a central conductor Wc, a dielectric Di surrounding the central conductor Wc, an external conductor Wb such as a braided wire that covers the dielectric Di, and an insulating sheath Wi that clads the external conductor Wb.

The coaxial plug 10 includes a contact 1 by a three-point contact, a housing 3 including first and second connection bases, and a conductive shell 5. Further, the housing 3 includes a block-shaped crimp housing 7. Further, the shell 5 includes a pair of first barrels 521 and 521 and a pair of second barrels 522 and 522.

The contact 1 can electrically connect a cylindrical central contact 2, which is a mating contact, and the central conductor Wc of the coaxial cable Cb (see FIG. 1).

Figure 7:
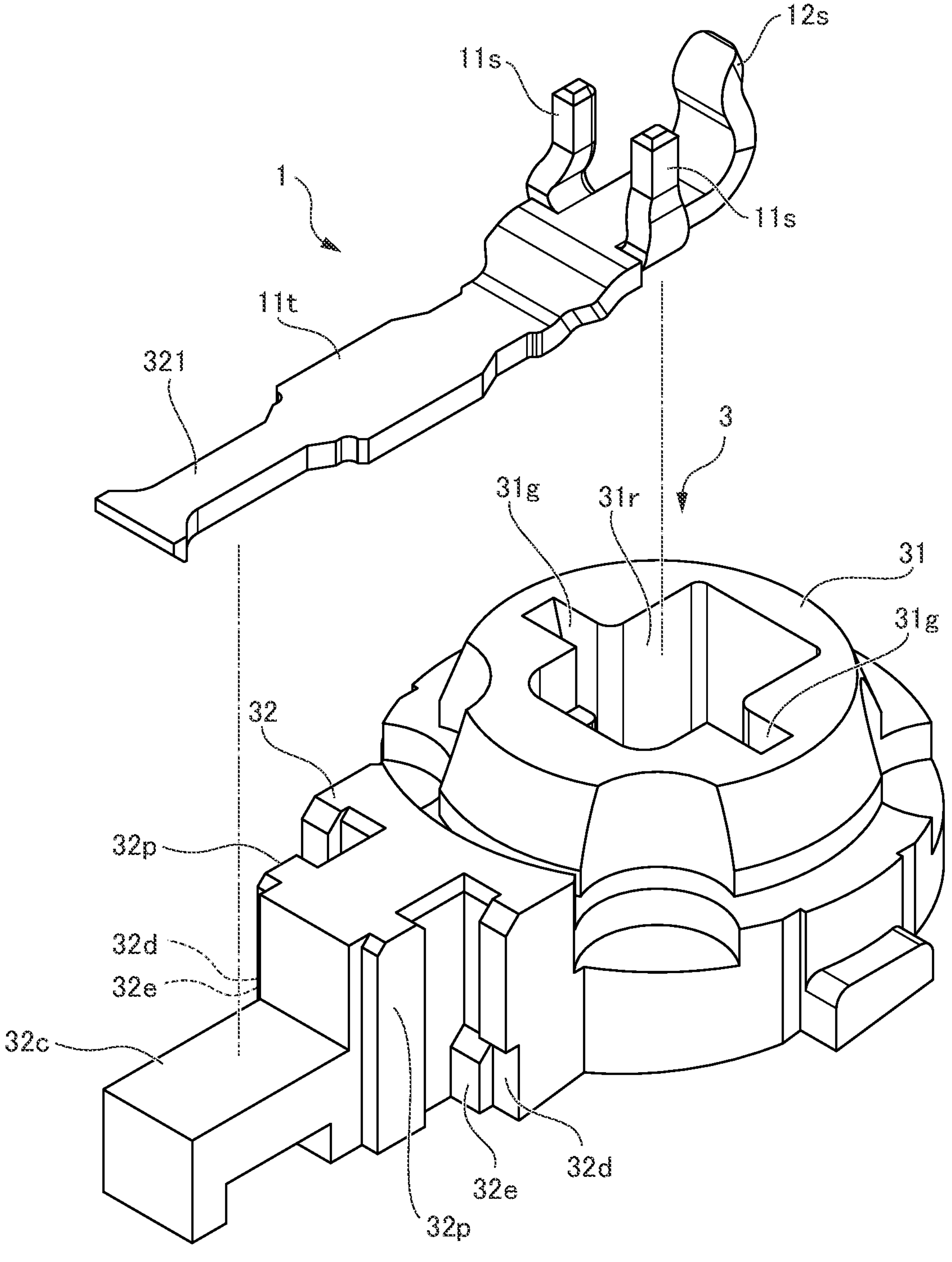
FIG. 7 shows a configuration of a housing provided in the coaxial connector according to the embodiment, and is an external view showing individually the contact and the housing to be integrally molded.

Referring to FIG. 7, the contact 1 includes a strip-shaped metal plate lit having an installation surface 321 at a base end, a pair of fixed terminals 11*s* and 11*s* and a movable terminal 12*s* on a tip end side of the metal plate lit. The pair of fixed terminals 11*s* and 11*s* and the movable terminal 12*s* are erected from the tip end side of the metal plate lit. In other words, the pair of fixed terminals 11*s* and 11*s* and the movable terminal 12*s* are respectively formed by a portion of the metal plate bent in a direction substantially perpendicular from an extending plane of the metal plate lit. The central contact 2 can be inserted into a space surrounded by the pair of fixed terminals 11*s* and 11*s* and the movable terminal 12*s* (see FIG. 1).

The pair of fixed terminals 11*s* and 11*s* are disposed to face each other in a direction substantially orthogonal to a longitudinal direction in which the metal plate 11*t* extends. The movable terminal 12*s* that can be elastically deformed is a plate spring terminal disposed in a state of facing an intermediate portion of the pair of fixed terminals 11*s* and 11*s*. When the central contact 2 is inserted into the space surrounded by the pair of fixed terminals 11*s* and 11*s* and the movable terminal 12*s*, the pair of fixed terminals 11*s* and 11*s* and the movable terminal 12*s* can externally contact an outer periphery of the central contact 2 by three-point contact.

Referring to FIGS. 2 to 6, the contact 1 is molded integrally with the housing 3. The installation surface 321 of the contact 1 is exposed onto a connection surface 32*c* provided at a position come down by one step from an upper surface of a second connection base 32 to be described below, and can come into contact with the central conductor Wc. The central conductor Wc is placed on the installation surface 321, and can be reliably electrically connected to the contact 1 by the crimp housing 7 pushed down toward the housing 3.

Referring to FIG. 6 to FIGS. 8A and 8B, the housing 3 includes a first connection base 31 having a disk portion and a second connection base 32 having a complex rectangular portion. The second connection base 32 has a shape that partially protrudes from the disk portion of the first connection base 31. The first connection base 31 includes an accommodation space 31*r* in a center of the disk portion (see FIG. 2 or 3).

Figure 2:
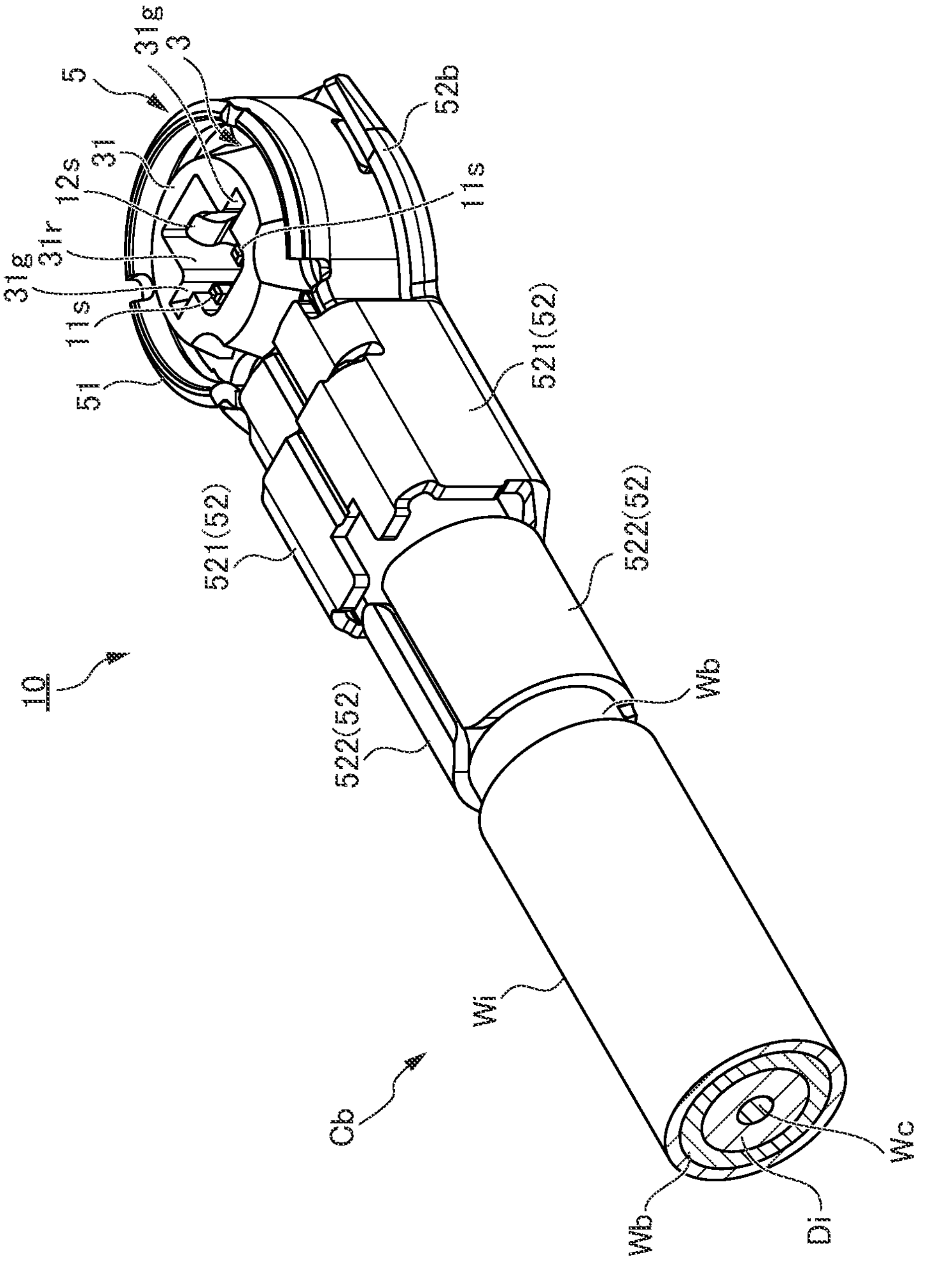
FIG. 2 shows the configuration of the coaxial connector according to the embodiment, and is an external view of the coaxial connector configured on the terminal of the coaxial cable when viewed from a lower surface side.
Figure 3A:
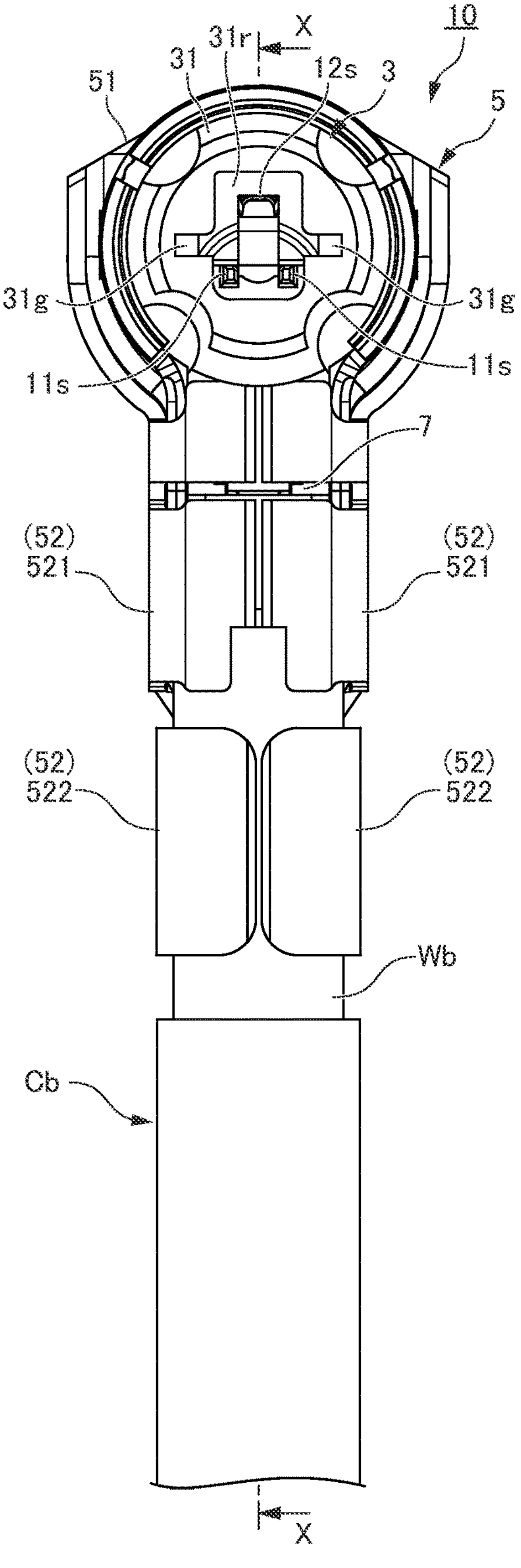
Figure 3B:
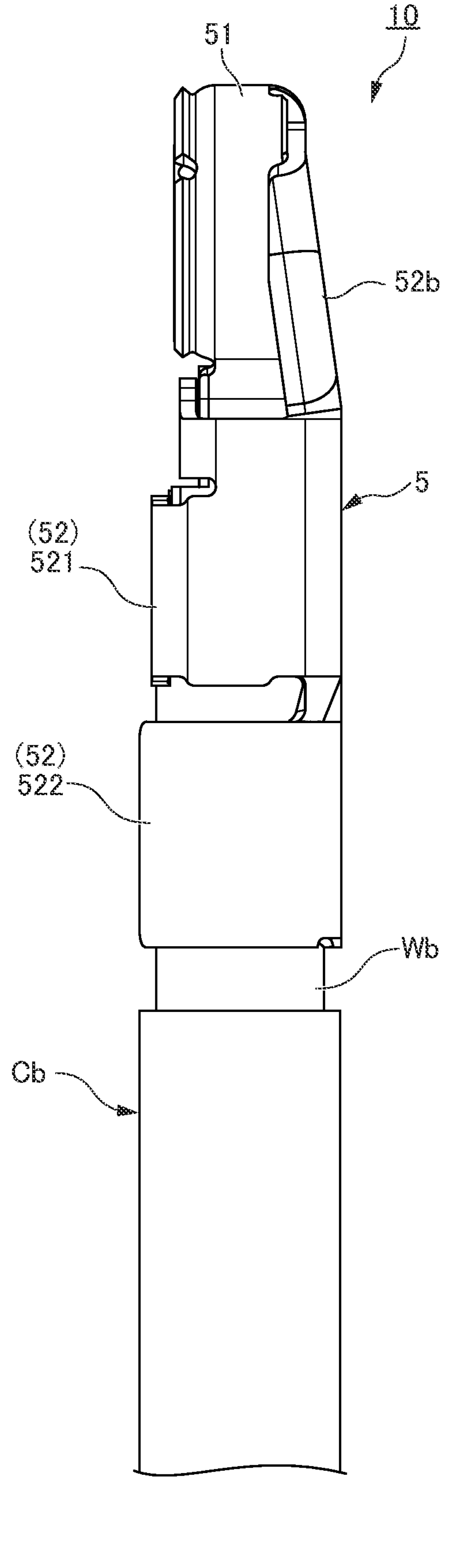
Figure 5:
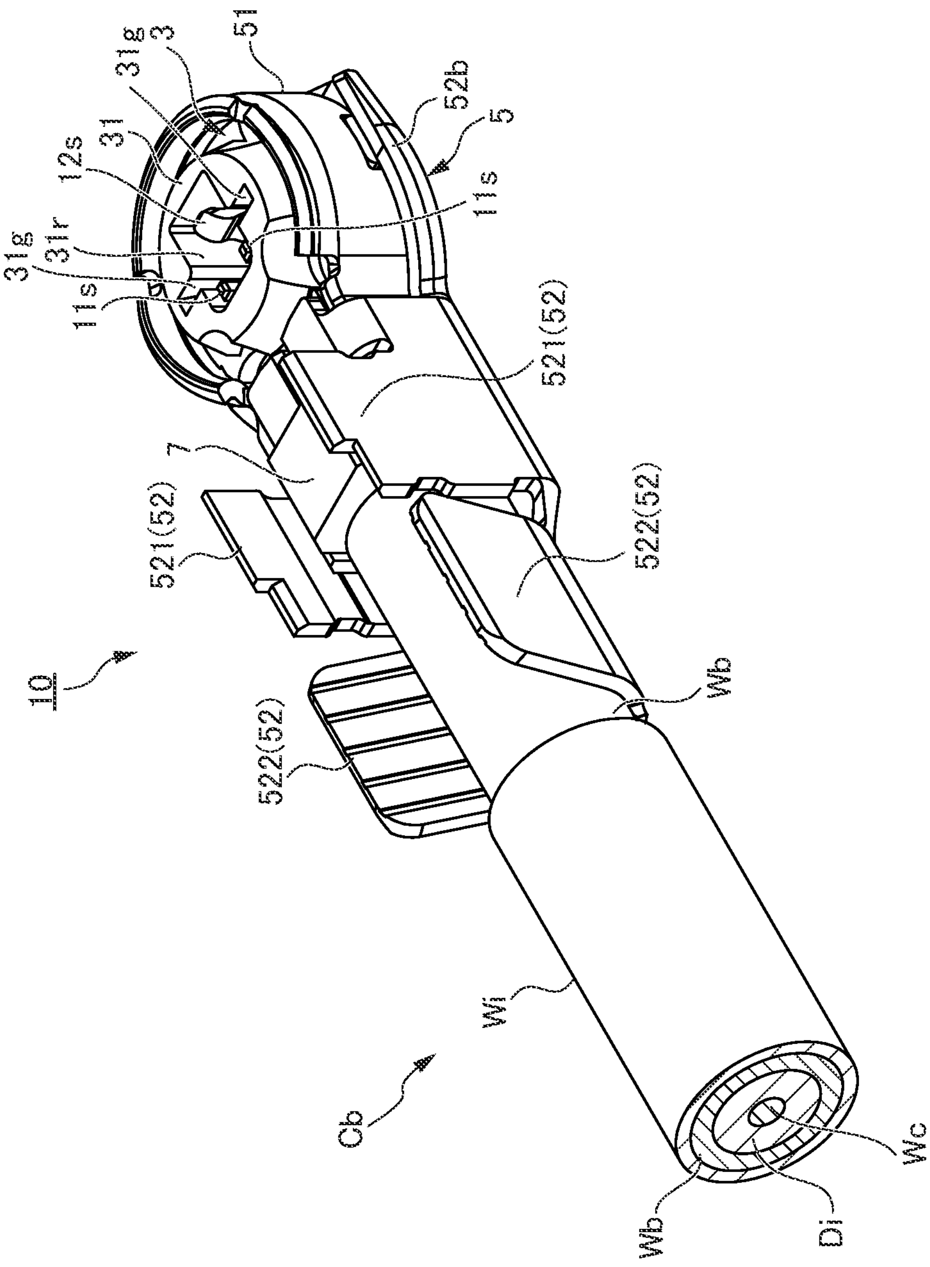
FIG. 5 shows the configuration of the coaxial connector according to the embodiment, and is an external view corresponding to FIG. 2 showing a state before the terminal of the coaxial cable is crimped.
Figure 9:
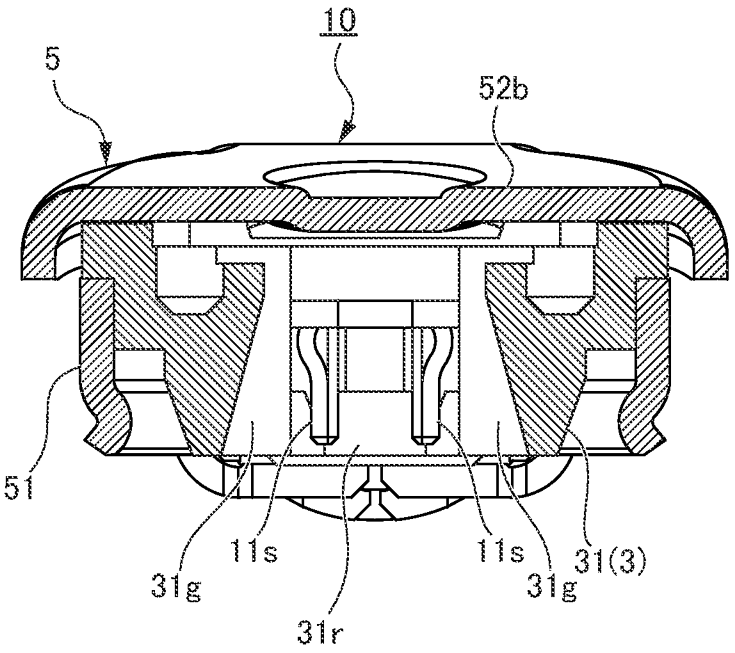
FIG. 9 is a cross-sectional view taken along a line A-A of FIG. 4 showing the configuration of the coaxial connector according to the embodiment.
Figure 10:
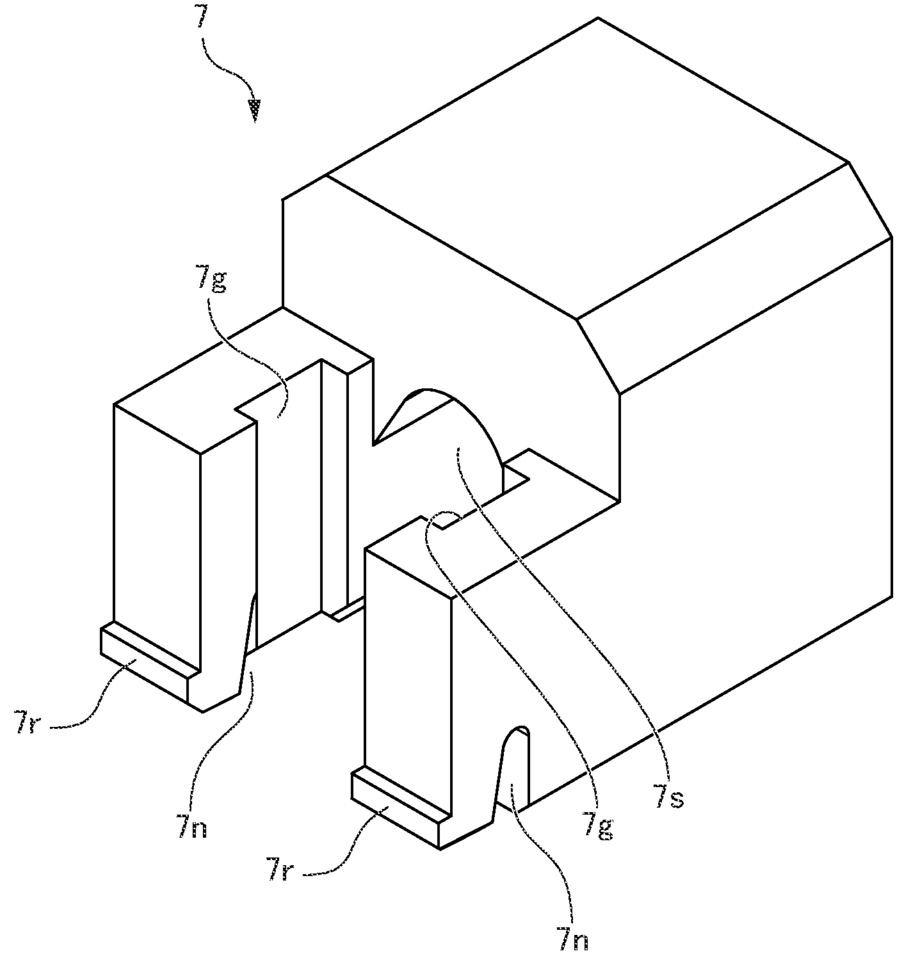
FIG. 10 is an external view showing a configuration of a crimp housing provided in the coaxial connector according to the embodiment.

Referring to FIG. 2 or FIGS. 3 and 5, the accommodation space 31*r* has a form in which one surface of the housing 3 is opened such that the central contact 2 can be inserted. The accommodation space 31*r* is formed in a substantially rectangular shape, and is disposed with the pair of fixed terminals 11*s* and 11*s* and the movable terminal 12*s* therein. The accommodation space 31*r* includes a pair of gaps 31*g* and 31*g* that are inclined from the rectangular region and extend outward from each other (see FIG. 9). Thus, the accommodation space 31*r* has a shape similar to a plus (+) on an upper surface of the disk portion of the first connection base 31. This is one of configurations for the purpose of measures against deformation and maintenance of elasticity according to various environments of the disk portion or the accommodation space 31*r* of the first connection base 31.

Referring to FIG. 5, the shell 5 includes a cylindrical portion 51 and an extension portion 52. The cylindrical portion 51 is configured to surround the disk portion of the first connection base 31. The cylindrical portion 51 can accommodate the first connection base 31 of the housing 3.

An external contact 6 of a mating connector 20 to be described below can be inserted inside the cylindrical portion 51 (see FIG. 1). When the external contact 6 is inserted inside the cylindrical portion 51, the shell 5 and the external contact 6 can be electrically connected. Further, the contact 1 and the central contact 2 can be electrically connected.

Referring to FIGS. 1 to 6, the extension portion 52 is configured to be coupled to the cylindrical portion 51. The extension portion 52 has a gutter-shaped configuration to be coupled to a part of the outer periphery of the cylindrical portion 51 and to extend away from the outer periphery of the cylindrical portion 51. Then, the extension portion 52 can accommodate the second connection base 32 of the housing 3 therein (see FIG. 2 or 5). Further, the extension portion 52 acts on fixing of the coaxial cable Cb.

More specifically, the extension portion 52 includes a pair of first barrels 521 and 521 and a pair of second barrels 522 and 522. The pair of first barrels 521 and 521 can press the crimp housing 7 against the second connection base 32, and thus can crimp the central conductor Wc of the coaxial cable Cb against the installation surface 321 of the contact 1. The pair of second barrels 522 and 522 can crimp the external conductor Wb from above the dielectric Di.

When the pair of second barrels 522 and 522 crimp the external conductor Wb surrounding the dielectric Di, the external conductor Wb and the shell 5 can be electrically connected. Thereby, the coaxial plug 10 can be fixed to the terminal of the coaxial cable Cb.

Referring to FIGS. 1 to 6, the extension portion 52 further includes a bottom plate piece 52*b* that covers an opening of the cylindrical portion 51 on the other surface of the housing 3. In other words, the first connection base 31 constituting the disk portion is accommodated by the bottom plate piece 52*b* and the cylindrical portion 51.

Figure 4:
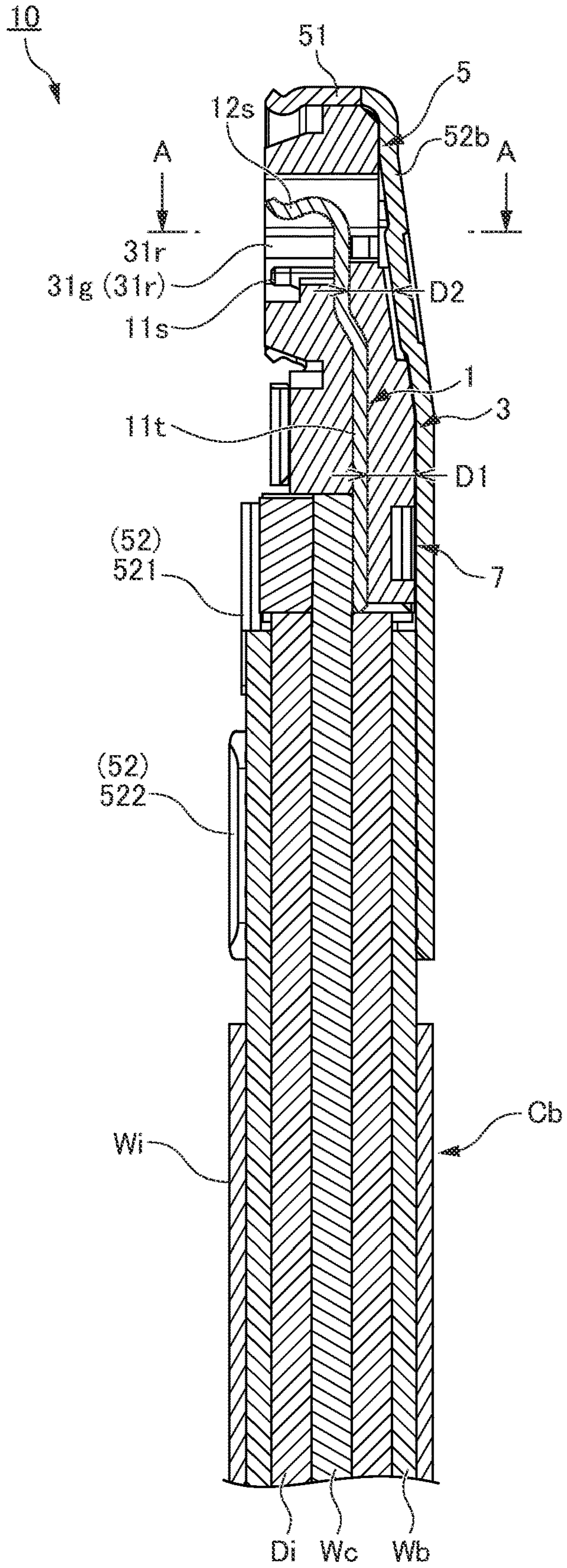
FIG. 4 is a cross-sectional view taken along a line X-X of FIG. 3A showing the configuration of the coaxial connector according to the embodiment.

Referring to FIG. 4, the bottom plate piece 52*b* has an inclined surface which is higher on a side on which the first and second barrels (521, 522) of the extension portion 52 are formed and is lower on the tip end of the coaxial connector 10.

Configuration of Mating Connector Next, a description will be given with reference to FIG. 1 with respect to a configuration of a receptacle (mating connector) 20 to which the coaxial plug 10 according to the embodiment is connected. The receptacle 20 according to the embodiment is surface-mounted on a printed circuit board (not shown). The receptacle 20 includes a cylindrical central contact 2 having a closed tip end, a housing 4 made of a dielectric, and an annular external contact 6.

The central contact 2 is related to a main body 21 formed on a concentric circle of the central contact and a lead terminal 2*r* of the central contact 2, and the lead terminal 2*r* can be soldering-joined to a signal pattern in a wiring pattern of the printed circuit board (not shown). The external contact 6 is related to a main body 61, which is formed on the concentric circle of the main body 21 and has an opened upper surface, and a lead terminal 6*r* of the external contact 6, and the lead terminal 6*r* can be soldering-joined to a ground pattern in the wiring pattern of the printed circuit board (not shown).

The housing 4 is formed in a shape of a rectangular plate. The central contact 2 and the external contact 6 are integrally molded by the housing 4, and thus the central contact 2 and the external contact 6 are fixed to each other. A dielectric material is abundant inside the housing 4, and the central contact 2 and the external contact 6 are electrically insulated from each other.

When the coaxial plug 10 is connected to the receptacle 20, the central conductor Wc existing in the coaxial cable Cb can be connected to the central contact 2, and the external conductor Wb existing in the coaxial cable Cb can be connected to the external contact 6. Thereby, it is possible to transmit a high frequency signal from the coaxial cable Cb to the printed circuit board, and to transmit a high frequency signal from the printed circuit board to the coaxial cable Cb.

Configuration of Contact

Figure 8A:
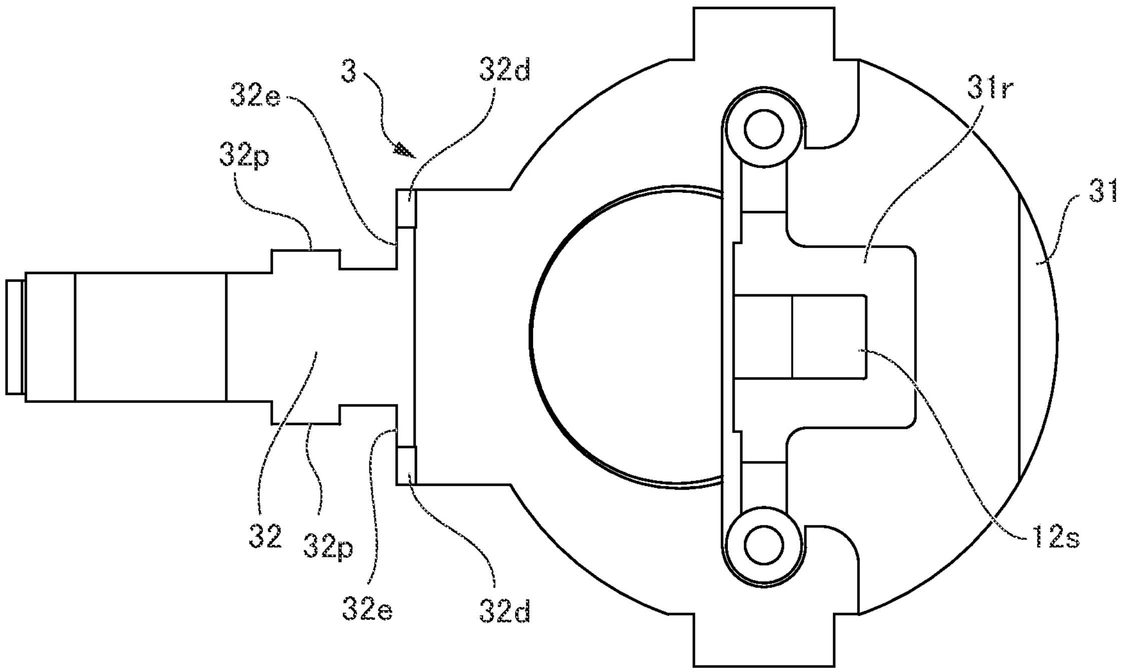
Figure 8B:
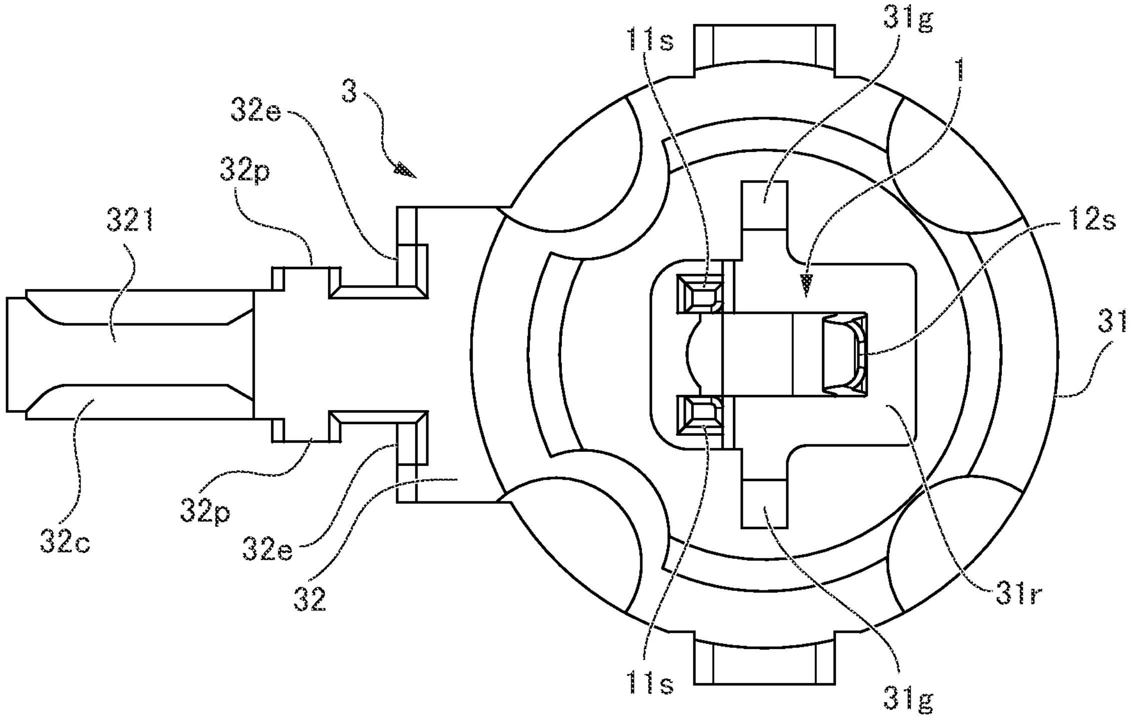

A configuration of the contact 1 according to the embodiment will be described below with reference to FIGS. 7 and 3A and FIG. 8B. As the contact 1, it is possible to obtain the contact 1 having a desired shape by three-point contact by punching and bending a conductive metal plate. The contact 1 is preferably made of a copper alloy, bit is not limited to the copper alloy.

The pair of fixed terminals 11*s* and 11*s* are located at a set of vertices, among vertices of a virtual equilateral triangle inscribed in the central contact 2. On the other hand, the movable terminal 12*s* is located at the other vertex of the virtual equilateral triangle. Then, the contact surface of the movable terminal 12*s* is disposed in a state of facing the intermediate portion of the pair of fixed terminals 11*s* and 11*s*. More specifically, the movable terminal 12*s* is disposed in a state of being elastically deformed in a direction along a straight line passing through the vertex of the virtual equilateral triangle, at which the movable terminal 12*s* is located, and the intermediate portion of the pair of fixed terminals 11*s* and 11*s*.

When the central contact 2 of the receptacle 20 is inserted into the accommodation space 31*r* of the first connection base 31, the outer periphery of the central contact 2 comes into contact with ridge portions (contact edges) of the pair of fixed terminals 11*s* and 11*s* located in the accommodation space 31*r* and comes into contact with the movable terminal 12*s*. In this way, the contact 1 can make three-point contact with the central contact 2.

Configuration of Housing

A configuration of the housing 3 according to the embodiment will be described below with reference to FIG. 2 to FIGS. 8A and 8B. The housing 3 is preferably made of an insulating synthetic resin, and the insulating synthetic resin can be molded to obtain the housing 3 having a desired shape.

Referring to FIG. 4, the coaxial plug 10 is configured such that a distance from the contact 1 (metal plate lit) to the bottom surface of the shell 5 is substantially equal at the tip end side and the base end side of the contact 1. In order to contribute to such a feature, the bottom plate piece 52*b* of the cylindrical portion 51 has the inclined surface as described above.

More specifically, the housing 3 is formed so that a difference between a distance D2 from the tip end side of the contact 1 to the bottom surface of the shell 5 and a distance D1 from the base end side of the contact 1 to the bottom surface of the shell 5 is made as small as possible. A thickness of the housing 3 is substantially the same on the tip end side and the base end side of the contact 1. In other words, there is a relation of D2≈D1.

On the tip end side and the base end side of the contact 1, it is possible to inhibit disturbance of impedance by making the difference small between the distance from the tip end side of the contact 1 (metal plate lit) to the shell 5 and the distance from the base end side of the contact 1 to the shell 5. Thereby, it is possible to increase a high frequency band of the high frequency signal transmitted to the coaxial plug 10. For example, VSWR (voltage standing wave ratio) can be inhibited to less than "1.5" up to 60 GHz.

Configuration of Shell

A configuration of the shell 5 according to the embodiment will be described below with reference to FIGS. 1 to 6. As the shell 5, it is preferable to obtain the shell 5 having a desired shape by molding a deployable plate having conductivity such as a metal plate processed into a predetermined outer shape. The shell 5 preferably includes a cylindrical portion 51 and an extension portion 52 that has at least a gutter-shaped.

In the extension portion 52, the pair of first barrels 521 and 521 and the pair of second barrels 522 and 522 are preferably bent and shaped in a state of being open. Further, the bottom plate piece 52*b* of the cylindrical portion 51 is preferably shaped in the extension portion 52.

The pair of first barrels 521 and 521 can be bent to enclose the crimp housing 7 attached to the second connection base 32. When the crimp housing is pressed by the pair of first barrels 521 and 521, the central conductor Wc placed on the installation surface 321 of the second connection base 32 can be firmly crimped to the installation surface 321.

The pair of second barrels 522 and 522 can be bent to enclose the external conductor Wb surrounding the dielectric Di. Thus, the pair of second barrels 522 and 522 are crimped to the external conductor Wb to electrically connect the external conductor Wb and the shell 5 to each other and to fix the coaxial connector 10 to the terminal of the coaxial cable Cb.

Configuration of Crimp Housing

Next, referring to FIGS. 6, 9, 10 and FIGS. 11A and 11B, a configuration of the crimp housing 7 according to the embodiment will be described. The crimp housing 7 includes a slot 7*s* notched in a U shape. The slot 7*s* is formed so as to be capable of pressing the outer periphery of the central conductor Wc. The crimp housing 7 can be inserted from the opening side of the accommodation space 31*r* toward a predetermined portion of the second connection base 32. The predetermined portion has, for example, a configuration for holding the crimp housing 7 in the second connection base 32.

One end of the crimp housing 7 is provided with a pair of lances 7*r* and 7*r*. The pair of lances 7*r* and 7*r* are disposed across straddle the slot 7*s*. A pair of guide grooves 7*g* and 7*g* are provided between each of the pair of lances 7*r* and 7*r* and the slot 7*s*. A pair of notches 7*n* and 7*n* are provided between the guide grooves 7*g* and 7*g* and the lances 7*r* and 7*r*, respectively. Thereby, deformation accompanied by elasticity is allowed at peripheral parts of the lances 7*r* and 7*r*.

Figure 6:
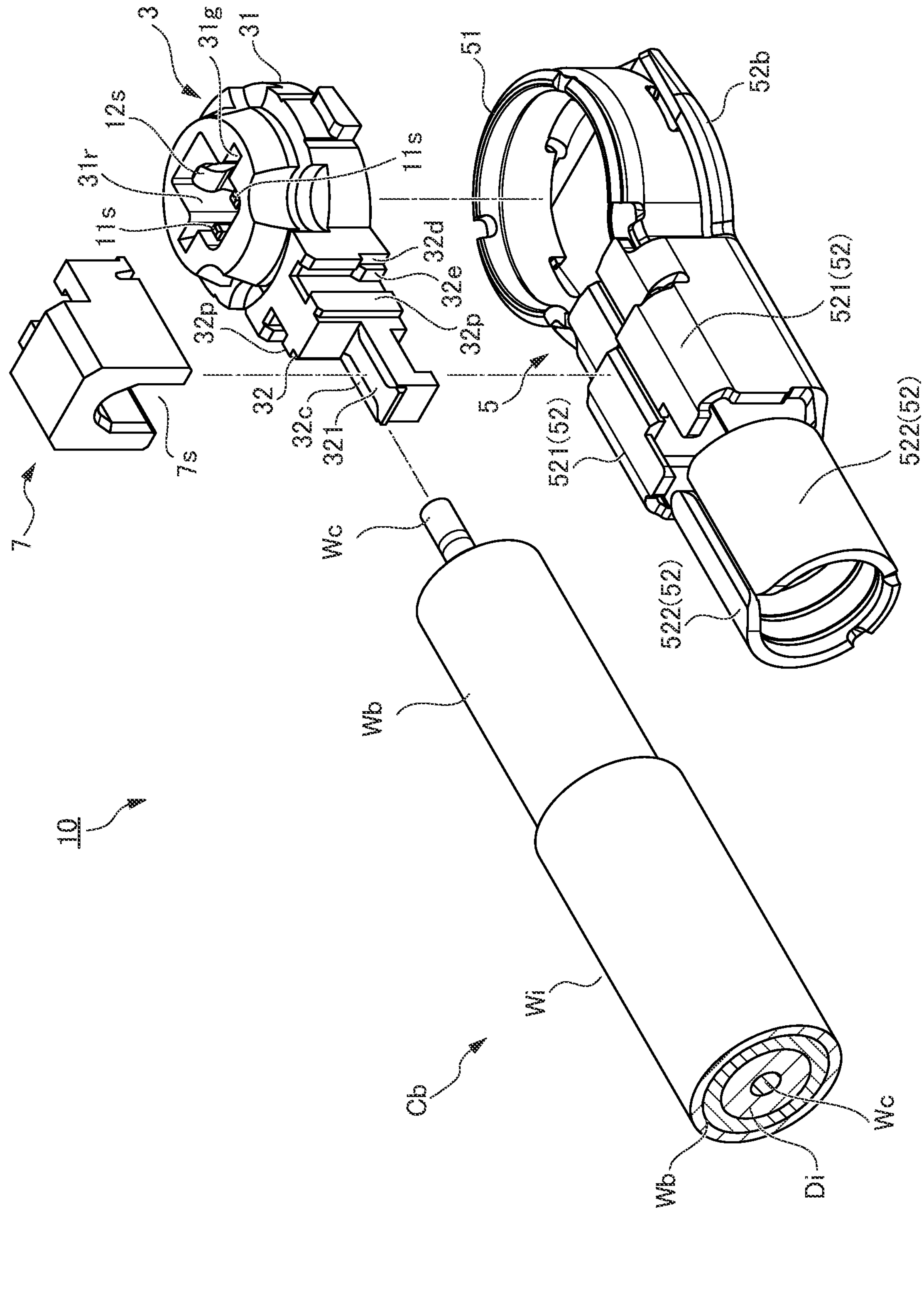
FIG. 6 is a perspective exploded assembly view showing the configuration of the coaxial connector according to the embodiment.

On the other hand, referring to FIG. 6 or 7, a pair of steps 32*d* and 32*d* are formed in the second connection base 32 of the housing 3 so as to be capable of engaging with the pair of lances 7*r* and 7*r* of the crimp housing 7. Further, a pair of raised portions 32*e* and 32*e* for pressing are formed inside the pair of steps 32*d* and 32*d* so as to be inclined and raised from base ends of the steps 32*d* and 32*d*. Positioning projections 32*p* and 32*p* are formed between the pair of steps 32*d* and 32*d* and the raised portions 32*e* and 32*e* and the connection surface 32*c*. When the crimp housing 7 is pushed into the second connection base 32 through fitting of the guide grooves 7*g* and 7*g* and the projections 32*p* and 32*p*, the lances 7*r* and 7*r* are engaged with the steps 32*d* and 32*d*. Thus, the crimp housing 7 is held by the second connection base 32.

Figure 11A:
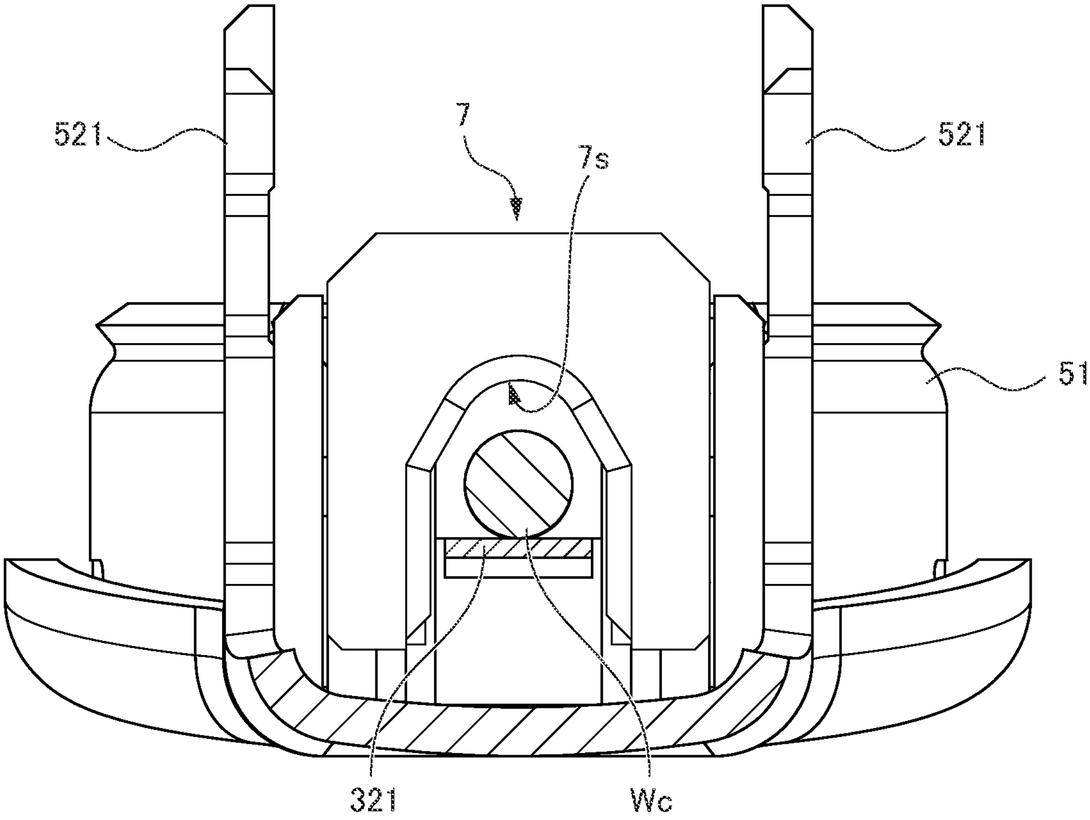

Referring to FIG. 11A, a state is shown in which the central conductor Wc is placed on the installation surface 321 and the crimp housing 7 is held by the second connection base 32. In such a state, the slot 7*s* of the crimp housing 7 does not press the central conductor Wc. Next, referring to FIG. 11B, the pair of first barrels 521 and 521 are bent processed to enclose the crimp housing 7. Thereby, the central conductor Wc on the installation surface 321 is pressed by the slot 7*s*, and the central conductor Wc is crimped to the installation surface 321. At this time, the pair of lances 7*r* and 7*r* of the crimp housing 7 move from the pair of steps 32*d* and 32*d* and are located in a plane regions of the raised portions 32*e* and 32*e*, respectively. Thereby, due to the deformation around the lances 7*r* and 7*r* on which the pair of notches 7*n* and 7*n* act, the crimp housing 7 is firmly positioned through the fitting of the guide grooves 7*g* and 7*g* and the projections 32*p* and 32*p* of the second connection base 32. As a result, the central conductor Wc can be connected to the contact 1.

In the coaxial plug 10 according to the embodiment, the central conductor Wc is pressed against and crimped to the installation surface 321 using the crimp housing 7 and the pair of first barrels 521 and 521 that press the crimp housing 7. Thus, the central conductor Wc is reliably bonded to the contact 1.

Operational Effects of Coaxial Connector

Next, operational effects of the coaxial connector 10 according to the embodiment will be described.

Referring to FIGS. 1 to 9, the coaxial plug 10 according to the embodiment includes a three-point contact type contact 1 that externally contacts the central contact 2 by three-point contact. The three-point contact type contact 1 is configured by the pair of fixed terminals located at a set of vertices among vertices of the virtual equilateral triangle inscribed in the central contact 2 and the movable terminal located at the other vertex. The elastic displacement of the movable terminal is mainly within the direction toward the intermediate portion of the pair of fixed terminals and the opposite direction. This makes it possible to make the connector smaller than a coaxial connector using a two-point contact type contact that requires the terminals to spread in the direction away from each other.

Referring to FIG. 4, in the coaxial plug 10 according to the embodiment, it is possible to inhibit disturbance of impedance by making the difference (difference between D2 and D1) small between the distance from the tip end side of the contact 1 (metal plate 11*t*) to the shell 5 and the distance from the base end side of the contact 1 to the shell 5. Thereby, it is possible to increase the high frequency band of the high frequency signal transmitted to the coaxial plug 10.

Figure 11B:
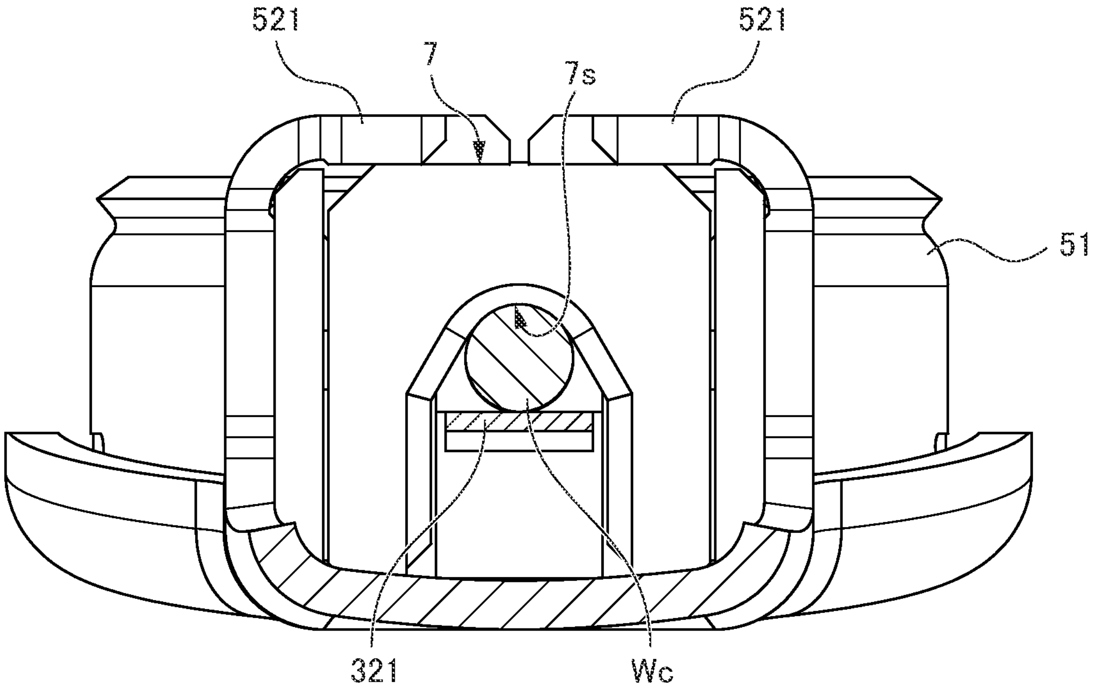

Referring to FIGS. 11A and 11B, from the state in which the central conductor Wc is placed on the installation surface 321 and the crimp housing 7 is held by the second connection base 32, the central conductor Wc is crimped to the installation surface 321 through the pair of first barrels 521 and 521 and the crimp housing 7. In other words, the central conductor Wc is connected to the contact 1 by pressing the outer periphery of the central conductor Wc facing the installation surface 321 with the bottom of the slot 7*s*.

The coaxial connector according to the present invention has a configuration in which it externally contacts the mating contact by three-point contact. The pair of fixed terminals act as contact edges to the mating contact, and the allowance to spread in the direction away from each other in the horizontal direction cannot be required or can be minimized. The elastic displacement of the movable terminal provided only one is mainly within the direction toward the intermediate portion of the pair of fixed terminals and the opposite direction. Also in the shell, the thickness of the cylindrical portion surrounding the first connection base is made small as much as possible, and thus the coaxial connector can be downsized.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A coaxial connector configured on an end of a coaxial cable including a central conductor, a dielectric surrounding the central conductor, an external conductor that covers the dielectric, and an insulating sheath that clads the external conductor, the coaxial connector comprising:

a contact capable of being connected to a cylindrical mating contact, the contact including a pair of fixed terminals and a movable terminal, the terminals being erected from a tip end side of a strip-shaped metal plate and being capable of externally contacting the mating contact by three-point contact;

a housing including a first connection base and a second connection base, the first connection base including an accommodation space in which one surface side is open such that the mating contact is insertable and the pair of fixed terminals and the movable terminal are disposed inside, the second connection base partially protruding from the first connection base; and a conductive shell including a cylindrical portion that is open to the one surface side and is provided to surround the first connection base, and an extension portion at least including a gutter-shaped configuration that is coupled to the cylindrical portion and is capable of accommodating the second connection base therein.

2. The coaxial connector according to claim 1, wherein the pair of fixed terminals are located at a set of vertices among vertices of a virtual equilateral triangle inscribed in the mating contact, and the movable terminal is located at the other vertex of the virtual equilateral triangle, and is disposed in a state of being elastically deformed in a direction along a straight line passing through the vertex of the virtual equilateral triangle and an intermediate portion of the pair of fixed terminals.

3. The coaxial connector according to claim 1, wherein the contact is molded integrally with the housing, and the contact includes at least:

an installation surface in which a base end of the metal plate is exposed on a predetermined surface of the second connection base, the installation surface being capable of coming into contact with the central conductor; and contact edges of the pair of fixed terminals, the contact edges being exposed to the accommodation space and capable of coming into contact with the mating contact.

4. The coaxial connector according to claim 1, further comprising:

a crimp housing including a slot that is notched so as to be capable of pressing an outer periphery of the central conductor and capable of being inserted from an opening side of the accommodation space toward a predetermined portion of the second connection base, wherein the extension portion of the shell includes a pair of first barrels capable of pressing the crimp housing against the second connection base, and a pair of second barrels capable of crimping the external conductor.

* * * * *